United States Patent [19]

Resener

[11] 4,310,729
[45] Jan. 12, 1982

[54] SELECTOR SWITCH WITH COMMON ACTUATOR BOTH FOR CIRCUIT SELECTION AND FOR SELECTION INDICATION

[75] Inventor: Baird E. Resener, Warren, N.J.

[73] Assignee: Western Electric Company, Inc., New York, N.Y.

[21] Appl. No.: 164,604

[22] Filed: Jun. 30, 1980

[51] Int. Cl.³ .................... H04H 19/10; H04M 1/30
[52] U.S. Cl. .................. 179/90 R; 179/90 AN; 200/155 R; 200/11 K
[58] Field of Search .......... 179/90 R, 90 AN, 90 FW; 200/179, 180, 155 R, 157, 11 R, 11 K, DIG. 29; 340/147 CV, 147 MD

[56] References Cited

U.S. PATENT DOCUMENTS

| | | | |
|---|---|---|---|
| 2,433,398 | 12/1947 | Richard | 179/90 R |
| 2,463,708 | 3/1949 | McCreary | 340/359 |
| 2,635,230 | 4/1953 | Madden | 340/365 R |
| 2,921,142 | 1/1960 | Tinus | 179/90 R |
| 2,922,994 | 1/1960 | Kennedy | 340/332 |
| 3,005,055 | 10/1961 | Mattke | 200/11 R |
| 3,311,717 | 3/1967 | Lace | 200/155 R |
| 3,952,176 | 4/1976 | Holder et al. | 200/11 K |
| 4,019,037 | 4/1977 | Monna | 200/155 R |
| 4,120,044 | 10/1978 | Harayda | 200/155 R |

FOREIGN PATENT DOCUMENTS

| | | | |
|---|---|---|---|
| 2020376 | 11/1971 | Fed. Rep. of Germany | 200/155 R |
| 2319306 | 11/1973 | Fed. Rep. of Germany | 200/155 R |

OTHER PUBLICATIONS

"Mechanical or Automatic Switching Equipment", *Standard Handbook for Electrical Engineers*, 1949, pp. 2035-2036.

*Primary Examiner*—Gerald L. Brigance
*Attorney, Agent, or Firm*—Charles Scott Phelan

[57] ABSTRACT

A switch (13) is provided with a common actuator (38) which is movable through successive discrete positions (47) for effecting successive circuit closures between a common circuit portion (21) and a selectable one of a plurality of conductors (20). In any selected position of the actuator, a deformation of the actuator, without changing its selected position, effects a further discrete circuit closure (58, 57) to indicate that an actuator position has been selected. These closures are advantageously utilized in a telephone station set environment to control a dialed digit display and to enable registration of a sequence of dialed digits for subsequent transmission.

7 Claims, 8 Drawing Figures

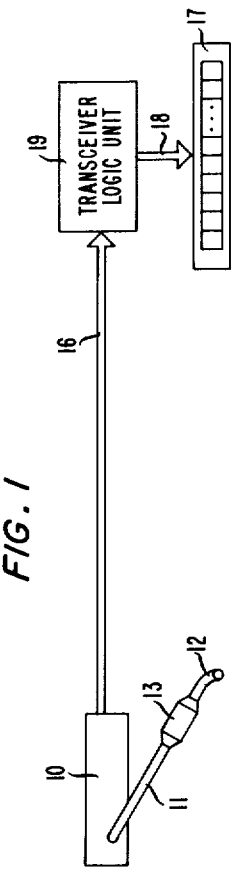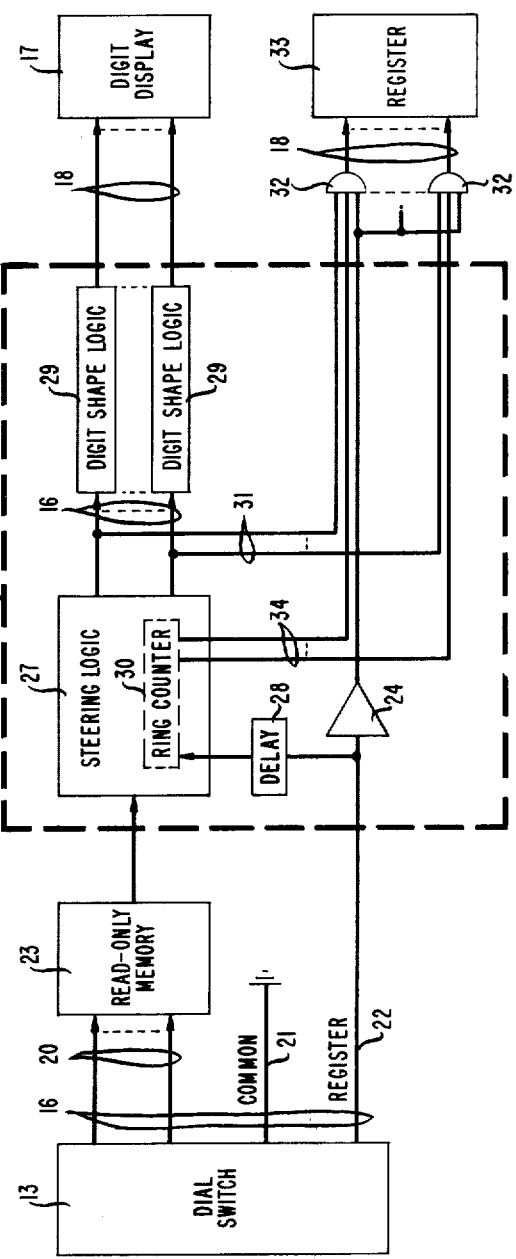

SELECTOR SWITCH WITH COMMON ACTUATOR BOTH FOR CIRCUIT SELECTION AND FOR SELECTION INDICATION

BACKGROUND OF THE INVENTION

This invention relates to a selector switch, and it relates in particular to such a switch which is useful for telephone dialing functions, e.g., in mobile radiotelephone applications.

Telephone dialing systems have traditionally required a user to see, or feel for, a spot at which to engage a finger to select a certain number for dialing. Then, in a dial pulse transmission system, the user operates a suitable mechanism to cause a telephone line circuit to be recurrently opened and closed according to a code in order to send the selected number. FIGS. 22-34 the A. E. Knowlton "Standard Handbook for Electrical Engineers," McGraw-Hill Book Company, New York, 1949, shows one example of a rotary dial mechanism.

It is well known in telephone systems to provide a visual display of dialed digits to enable a telephone station set user to verify the accuracy of a set of digits before initiating their transmission. U.S. Pat. Nos. 3,920,926 to Lenaerts et al., 2,921,142 to Tinus, and 2,433,398 to Richard are examples of such telephone station set arrangements. In each case, however, the user must be able by sight or touch to distinguish the respective digit selecting keys in order to input the desired information. In addition, Lenaerts et al. show an electronic system which allows the correction of a last-entered digit, and that feature tends to mitigate somewhat the likelihood of erroneous information transmission. Nevertheless, a user still must search out the respective dialing keys and the error correction key, if provided, by either visual or tactile means. In a Madden U.S. Pat. No. 2,635,230, a telephone dial is provided with a multi-apertured plate which is pivotally movable over a similarly configured plate bearing digit representations for achieving the transmission of signals representing selectable digits.

A Kennedy U.S. Pat. No. 2,922,994 is an example of a rotatable array of magnetic reed switches provided for sending electrical signals which are indicative of a rotatable shaft position. A McCreary U.S. Pat. No. 2,463,708 includes a rotary switch with a rotatable wiper for effecting circuit closure between a common wiper and a selectable one of plural fixed terminals.

SUMMARY OF THE INVENTION

The task of selecting a switch position for telephone dialing, for example, is facilitated in accordance with the present invention by providing a switch mechanism having a common actuator both for closing an electric circuit between a common terminal and a selectable one of a set of plural terminals and for closing a circuit between that same common terminal and another terminal to indicate that a selection has been made.

BRIEF DESCRIPTION OF THE DRAWING

A more complete understanding of the invention and the various features, objects, and advantages thereof may be obtained from a consideration of the following Detailed Description in connection with the appended claims and the attached drawings in which FIG. 1 is a simplified diagram of a mobile radiotelephone installation utilizing a dial switch according to the present invention;

FIG. 2 is a block and line diagram of electric circuits illustrating an application of the invention in the installation of FIG. 1;

DETAILED DESCRIPTION

Figure 3:
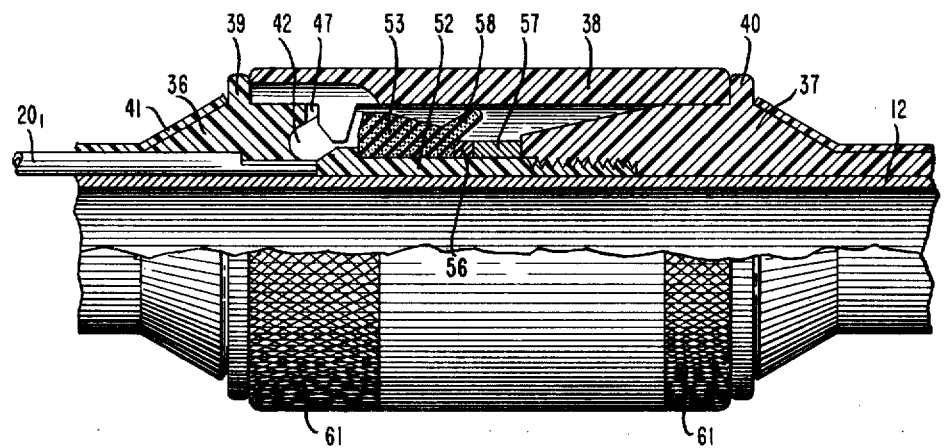
FIG. 3 is a side elevation, partly in section, of a dial switch in accordance with the present invention and wherein two parts are omitted.

In FIG. 1, a microphone assembly housing 10 is mounted in a convenient location in a motor vehicle (not shown) containing a mobile radiotelephone unit. Only those parts of the latter unit are shown which are useful for illustrating the manner of using the invention. One mounting location is above the door to the left of the driver of the vehicle. Pivotally mounted in any convenient fashion on the housing 10 is a microphone boom 11 which, in one embodiment, advantageously includes a metallic sound-transmitting tube 12 having an open end which is advantageously placed near a driver's mouth and leads back into the boom to a convenient position for actually mounting a microphone to be used in the radiotelephone installation. A dialing selector switch 13 in accordance with the invention is advantageously mounted on the tube 12 so that it can be conveniently reached and operated by a radiotelephone unit user such as a vehicle driver. Other locations for the switch 13 can be readily conceived, and one such location is, of course, mounting of the switch on a shaft which is, in turn, mounted in the bridge portion, between microphone and earpiece, of a conventional telephone station handset. A cable 16 advantageously extends from the switch 13 along the boom 11 into and through the housing 10 to control logic circuits, to be described, in a transceiver logic unit 19. A second cable 18 extends from the unit 19 to control a dialed digit display 17.

The logic unit 19 advantageously controls the interaction of all parts of the mobile radiotelephone unit in a manner now well known in the art for cooperation both among such parts and between such parts and a radiotelephone system base station. The logic unit advantageously includes a dialed digit register (33 in FIG. 2) into which signals representing digits selected by use of the switch 13 are collected for subsequent modulation onto an appropriate carrier for transmission from the radio unit in accordance with normal transceiver operation.

FIG. 2 depicts a block and line diagram of one embodiment of electric circuits for controlling the display 17 in response to operation of the dial switch 13. The switch 13, the structure of which will be described in greater detail, is manually operable to different positions to provide different one-out-of-n output signal combinations on a set of n leads 20 in cable 16 and corresponding, respectively, to at least n different positions for the switch 13. The one of the n leads which is selected is represented by an electric circuit closure within the switch 13 between the selected lead and a common lead 21 in cable 16. Lead 21 is connected to a reference potential, such as ground, which is common to all other circuit elements connected to FIG. 2 as part of their respective power supply arrangements included in the schematic representation of each. The output leads 20 of the switch 13 advantageously correspond to the digit pushbuttons 0-9, as well as other digit buttons, of a conventional push-button dialing and control arrangement for a mobile radiotelephone unit.

Switch 13 is also further operable to effect an electric circuit closure between the common lead 21 and an additional lead 22, which is here also for convenience designated as a register lead. The leads 20–22 are part of the aforementioned cable 16 which extends along the boom 11 from switch 13 through the housing 10 to logic unit 19 in FIG. 1. Additional circuits, to be described, and coupled to leads 20 and 22 are advantageously normally biased to operate in a first predetermined state when the input thereto through switch 13 is electrically open-circuited, and to be actuated to a second state upon closure of that input to ground through switch 13.

A code translator, such as a read-only memory 23, responds to the one-out-of-n signal combinations of leads 20 for producing binary coded decimal (BCD) signals or any other type of signals appropriate for controlling a particular digit display 17. For example, the one-out-of-n signals are advantageously employed as different addresses for the memory 23 to cause it to read out of the respectively actuated word locations corresponding binary coded decimal signal combinations in a conventional table look-up type of operation. Current mobile radiotelephone units often include microprocessor-based logic units which include memory; and the memory 23 is advantageously a dedicated region of such a memory.

Display control logic 26 includes signal steering logic 27 for receiving both the BCD signals from memory 23 and the register lead 22 signals from switch 13 by way of a delay circuit 28. The steering logic 27 comprises, for example, plural sets of four steering gates (not shown) that are respectively enabled by outputs of different stages of a ring counter 30, which has its active information bit stepped therealong in response to successive circuit closure signals on the register lead 22 received through the delay circuit 28. Logic 27 has fifteen such gate sets and corresponding output lead sets, one for each digit position of display 17 in an embodiment in which there are fifteen of the leads 20.

The steering logic 27 directs BCD signals to appropriate digit shaping logic units 29 for respective digit positions of the display 17. When a logic unit 29 receives, e.g., a four-bit BCD value signal from logic 27, it translates that signal into plural control signals required for the particular digit display 17 to energize the appropriate elements thereof for representing the numerical value, or other character information, corresponding to the selected one of leads 20 at that time. Each logic unit 29 also includes circuits for holding such information on the display until the signals held are overwritten by subsequently applied new signals for the same digit position of display 17. Thus, for applications, as will be described herein, where switch 13 has more than the M=15 positions, the absence of output from memory 23 at any time causes no change in the displayed information.

Display 17 is advantageously a multiposition array of individual digit displays, such as the well-known light emitting diode displays. Display 17 includes a sufficient number of digit positions for accommodating, e.g., the three area code digits, three office code digits, and four directory number digits of a typical telephone station number. Additional digit positions are also provided in the display 17 to accommodate other characters which might be usefully displayed, e.g. by a conventional seven-element digit display, at the same time as the number of a called telephone station. For example, special characters to indicate selection of the send dialed number, clear displayed and registered information, and end call functions. Each digit position in the display 17 requires only a number of input leads which is suitable for defining and holding the respective digit values that can be represented.

All n sets of output circuits of the steering logic 27 are also applied, as leads 31, to respective coincidence gates 32 which are enabled by the aforementioned circuit closure signal on lead 22 coupled through a buffer amplifier 24. That amplifier converts the ground closure to a positive level for enabling gates 32. For convenience of illustration, only a single gate is utilized for schematically representing a separate set of gates for each set of output circuits. The gates 32 are all partially enabled by the undelayed register lead 22 closure signal, and one of the gates 32 is further partially enabled by the active output of ring counter 30 on one lead of a set of leads 34. The combined enabling effect causes the sampling of the output of the steering logic 27 gate set which is then also enabled by counter 30. Such signal sample is coupled into the corresponding digit position of a register 33 in the logic unit 19 for storing such digit signals until such time as the radiotelephone unit user causes them to be transmitted.

During a normal operation of the switch 13, a user initially rotates a switch actuator through the different available positions and observes the digit character on the display 17 that is changing as the actuator position changes. When the character for clear-displayed-and-registered information is shown, a different operation (to be described) of the actuator causes the clearing character to be registered and thereafter, a clearing function is implemented by logic unit 19. Then a new actuator rotation sequence is begun by the user with the various characters selected being shown in the leftmost digit position of display 17 in FIG. 1. When the correct value is displayed, the user then actuates the registration function to effect closure between leads 21 and 22. That closure first enables the gates 32 to register the steering logic 27 output signal bits in the then current digit position of register 33. After the delay in circuit 28, ring counter 30 is actuated by the same closure signal to direct further input signals to the logic 27 to a new digit position of the display 17 and of the register 33. If successive digits include the same character, they are registered by two successive actuations of the registration function without intervening actuator rotation. The normal digit selection process is utilized to accomplish automatically any observed error correction that may be necessary before the user causes the system to be stepped to a new digit position.

FIG. 3 is a side elevation view, partly in section, of the dialing switch 13 otherwise shown in FIG. 1. The overall switch assembly is a roughly cylindrical array which is arranged around and coaxial with the speaking tube 12. The portion of switch 13 in section is that which, in end view, would be considered the upper front quadrant of the switch.

In the switch 13 assembly, a stationary portion of the switch includes a first, generally cylindrical, end member 36 of electrically nonconductive material such as polycarbonate. Member 36 is advantageously secured to the outer surface of the tube 12 by any convenient means such as adhesive bonding. The stationary part also includes a second, generally cylindrical, end member 37 of the same material which is threaded onto the right-hand end of the first member 36. When thus assembled, the two members 36 and 37 hold a rotatable cylindrical actuator 38 between respective circumferential flanges 39 and 40 on the members 36 and 37. The first member 36 is shown in greater detail in FIGS. 5 and 6, and the actuator is shown in greater detail in FIGS. 7 and 8. Other cylindrical, or ring-type, elements of switch 13 are fully represented by their respective sectioned views in FIG. 3. In one embodiment, the assembled elements 36–38 were less than 1.5 inches long and less than 0.75 inch in diameter.

The leads 20–22 of FIG. 2 are advantageously included as discrete insulated conductors in the cable 16 which is, for example, a ribbon-type cable, extended along and transversely wrapped around the tube 12 between the housing 10 and the switch 13. The respective leads 20 and 21 are inserted into a space defined by a portion of enlarged inside diameter at the left-hand end of the member 36 and by the outside face of tube 12. In the sectioned portion of FIG. 3, one such lead, $20_1$, is shown. The cable 16 portion wrapped around tube 12 is advantageously enclosed in a cover member 41 which also encloses the left-hand end of the member 36.

Figure 5:
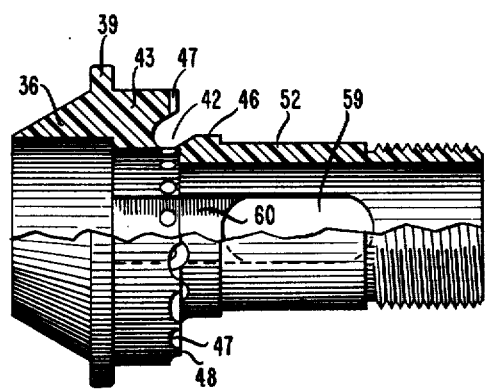
FIG. 5 is a side elevation, partly in section, of a stationary member of the dial switch of FIG. 3.
Figure 6:
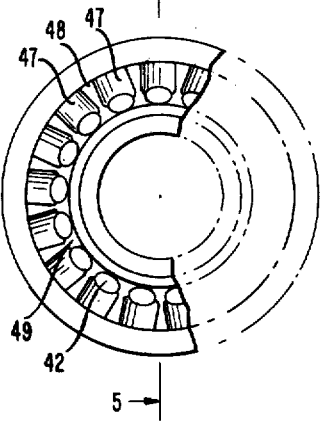
FIG. 6 is a right-hand end view of the member of FIG. 5.

At the end of each of the leads 20, the insulation on the portion of the conductor facing the inside surface of the member 36 is removed to expose the conductive portion thereof at a different one of plural openings in that surface. Each such opening is the radially innermost portion of a different one of a plurality of holes 42 which are substantially equally spaced in a circular array to provide a plurality of passages connecting the outer face of the member 36 with the inner face thereof. The holes 42 are best illustrated in FIGS. 5 and 6 wherein FIG. 5 is a partly sectioned side elevation, as in FIG. 1, with the section being taken at lines 5,5 in FIG. 6. Those holes advantageously have the radially outermost ends thereof at the juncture of a shoulder 43 of reduced diameter with respect to flange 39 and a shoulder 46 of further reduced diameter so that each hole appears in section, as shown in FIG. 5, as extending between the inner and outer faces of member 36 at an angle of approximately 45 degrees with respect to the longitudinal axis of the member 36. The circumferential portion, parallel to the longitudinal axis of member 36, of shoulder 43 provides a bearing surface for actuator 38. A similar surface is provided in member 37 for the opposite end of the actuator.

Each of the holes 42 has associated with the radially outermost end thereof a detent 47 which is conveniently formed as a radial passage in the right-hand face of shoulder 43. Each such passage has a center line which is perpendicular to the longitudinal axis of member 36 and intersects the center line of the corresponding one of the holes 42. These passages are of a diameter which is enough larger than the diameter of the corresponding hole 42 so that adjacent one of the passages intersect to form partitions 48 (in FIG. 6) between adjacent detents. Such partitions are, at the radial outer portion thereof, triangular as shown in end view in FIG. 6. The partitions also form a narrow but relatively flat plateau portion 49 between the respective holes 42.

Figure 4:
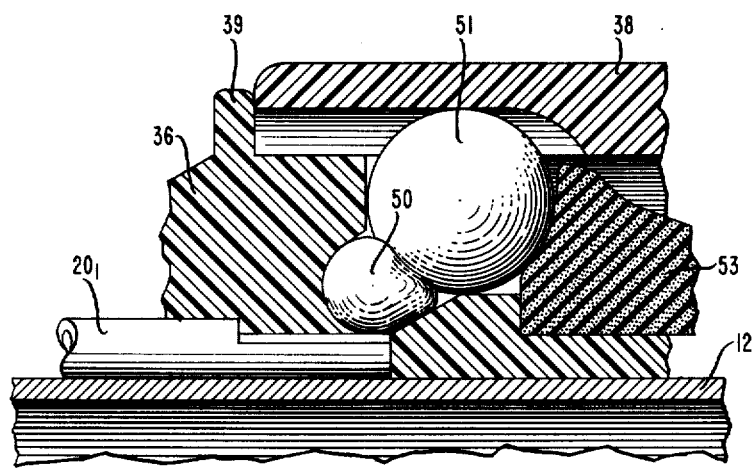
FIG. 4 is a cross-sectional diagram of a part of FIG. 3 illustrating the mentioned two parts in position in the apparatus.

Fifteen of the seventeen holes 42 illustrated in FIG. 6 contain a conductive elastomer ball 50 (FIG. 4) in a fully assembled switch 13. Each ball 50 is of slightly larger diameter than the hole 42 so that it must be slightly compressed in order to fit into its corresponding hole 42. These elastomer balls are not shown in FIG. 3 in order that the relative arrangements of the member 36 and the actuator 38 may be more easily appreciated. However, a portion of the sectioned region around the hole 42 of FIG. 3 is shown in FIG. 4 with one such ball 50 in place in its hole 42. That ball 50 is distorted from its normal free spherical configuration by both the compression necessary to place the ball 50 in the hole 42 and the application thereto of an additional distorting force applied by a rigid conductive sphere 51 which will be subsequently further described.

As thus illustrated in FIG. 4, it is apparent that a portion of the conductive elastomer ball 50 extends through the aforementioned lowermost portion of the hole 42 to engage electrically the exposed-wire portion of the insulated conductor $20_1$. A similar electrically conductive engagement prevails at each of the holes 42 under which an exposed conductor of cable 16 is located, whether or not the sphere 51 is also present at such hole. Thus, the balls 50 are terminals of switch 13. In the absence of the sphere 51 at a particular hole, the distortion of the corresponding one of the balls 50 is somewhat less than that illustrated in FIG. 4.

In FIG. 3, a still further reduced outside diameter portion 52 in the central portion of the member 36 has arranged therearound a conductive elastomer ring, or collar 53, a rigid insulating ring 56, and a rigid conductive ring 57. These latter three members are secured in place in the order named by a longitudinal compressive force applied by the member 37 which drives the collar 53 and the rings 56 and 57 together and up against the shoulder 46 of the member 36 when member 37 is threaded into place.

Collar 53 includes a circular flexible flange 58 around the outermost right-hand end thereof as seen in FIG. 3. The illustrated cross-sectional portion of flange 58 extends to the right and upward so that it overhangs the insulating ring 56 around the entire radially outermost surface thereof. Flange 58 also overhangs at least a part of the length of conductive rings 57 so that when any part of the flange 58 is deformed radially inwardly, it comes into electrical contacting engagement with the ring 57. The collar 53 and the ring 57 are electrically connected to the ends of conductors in different ones of the insulated leads 21 and 22, respectively, in the cable 16; and so those rings are additional terminals of switch 13. Leads 21 and 22 do not appear in FIG. 3; but they are connected to portions of the collar 53 and the ring 57, respectively, which lie over an oval-shaped passage 59 shown in FIG. 5. That passage extends between and connects the outer surface of the portion 52 and the inner surface of that portion. At the inner surface of portion 52, the passage 59 connects to a longitudinal keyway 60 which extends from the passage 59 along the inside surface of the member 36 to the enlarged inside diameter portion thereof which receives the ends of the leads in the cable 16 including leads 20. Leads 21 and 22 in that cable do not have insulation removed therefrom in the region of the holes 42, two of which are spanned by the keyway 60. Consequently, those two holes do not have balls 50 therein.

Figure 8:
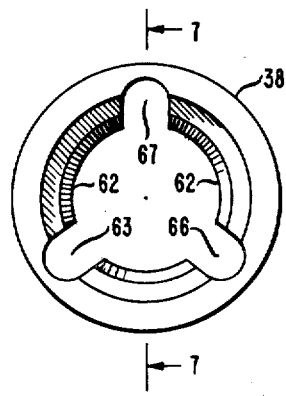
FIG. 8 is a left-hand end view of the actuator of FIG. 7.
Figure 7:
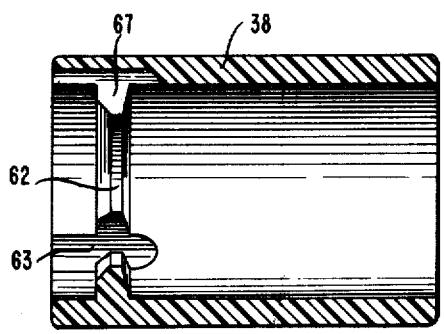
FIG. 7 is a cross-sectional view of a switch actuator in FIG. 3.

The generally cylindrical, rotatable actuator 38 is shown in greater detail in FIGS. 7 and 8 and is formed of a flexible nonconducting material such as acetal, vinyl, polypropylene, or the like. FIG. 7 is a cross-sectional view taken at the vertical diameter line 7,7 in the left-hand end view of actuator 38 shown in FIG. 8. Actuator 38 advantageously has in one embodiment, a wall thickness of about 0.05 inch and a length of about 0.75 inch. Knurled regions 61 are provided on the outer surface at the ends of the actuator 38 to facilitate the attainment of a fingertight grip for rotating the actuator without substantially deforming it in a radial direction so much as to make contact between flange 58 and ring 57. Near the left end of actuator 38, as illustrated in FIG. 7, is an inwardly extending flange 62 which has three approximately equally spaced passages 63, 66, and 67 therethrough spaced so that when any one of them is aligned with one of the detents 47, the other two will also be approximately aligned with other ones of the detents. This is achieved in the illustrative embodiment having seventeen detents, equispaced by 21.176 degrees, by spacing passages 63,66 105.883 degrees apart, passages 66,67 127.05 degrees apart, and passages 67,63 127.067 degrees apart. Those passages join respective longitudinal grooves in the inner surface of the actuator 38. Each of the latter grooves is of sufficient length so that it extends in the inner surface of the actuator 38 from the left end of the actuator through the flange 62 and, to a limited extent, to the right of that flange as shown in FIG. 7.

The flange 62 is of sufficient thickness in the longitudinal direction of the actuator 38 so that it occupies substantially all of the longitudinal space between tips of partitions 48, on the shoulder 43 of the member 36, and the collar 53. The flange 62 is also of sufficient radial length so that it extends into that longitudinal space almost to the shoulder 46. Thus, three chambers are formed in the mentioned longitudinal space by the flange 62 in cooperation with the shoulders 43 and 46 and the collar 53. These chambers are movable around the member 36 as the actuator 38 is turned.

Located in one of the chambers just mentioned is the aforementioned conductive sphere 51 of FIG. 4. That sphere has a smooth, hard conductive surface; and it is advantageously a palladium alloy, or gold, plated steel ball bearing. In the remaining two of the three chambers, there are ceramic spheres (not shown), e.g., of synthetic sapphire material, of similar diameter but lacking the conductivity feature of sphere 51. The nonconductive spheres are provided as force-balancing companions for the conductive sphere 51. As the actuator 38 is turned in either direction, these three spheres are moved through successive detent 47 positions. In the course of such movement, each of the spheres is driven from one of the detents 47 to the next over the intervening one of the partitions 48; and collar 53 is deformed to the right as shown in FIG. 4 to allow the sphere to pass. Each of the spheres, i.e., the conductive sphere 51 and the two force-balancing spheres, has a diameter such that the sphere readily clears the partition 48 when the sphere is near the extreme right-hand end of the groove associated with one of the passages 63, 66, or 67 in actuator 38, assuming maximum deformation of the elastomer collar 53.

Once a sphere has passed over a partition, the partial restoration, or relaxation, of the collar 53 toward its undeformed state urges the sphere longitudinally into the new detent. The use of three spaced spheres distributes the forces so actuator 38 remains essentially coaxial with members 36 and 37. The tactile impression of discrete detents is also enhanced for a user. In the case of sphere 51 and each hole 42 containing one of the balls 50, that sphere is thereby driven into conductive compressional engagement with the one of the conductive elastomer balls 50 in the hole 42 associated with that detent and without significant contact bounce. In the illustrative embodiment, seventeen holes and associated detents are provided as shown in FIG. 6.

It is thus apparent that the actuator 38 is rotatable in either direction around the assembled members 36 and 37 on tube 12 to move the conductive sphere 51 among the detents 47 into selectable electrically conductive engagement with different ones of the associated elastomer balls 50. As a result, in each detent where the conductive sphere 51 comes to rest in contact with a ball 50, an electric circuit closure is effected from one cable lead 20 at the lower end of the hole 42 associated with that detent, through the elastomer ball 50 in the hole, through the conductive sphere 51, and through the collar 53 to the lead 21 of the cable. As the actuator 38 is turned, characters corresponding to the respective positions of actuator 38 are displayed in a digit position of the display 17 as hereinbefore described in connection with FIG. 2. Each such character display is overwritten, i.e., replaced by a new character, as the actuator is turned. In the cases of numerical characters, the successively displayed values increase or decrease, depending upon the direction of actuator turning.

When a mobile unit user sees a desired character in the display 17, actuator 38 is deformed radially in at least one point on the circumferential region thereof, roughly midway between the ends thereof. Squeezing is most convenient in the illustrative embodiment. The squeezing is done with sufficient force to deform the actuator radially inwardly and thereby engage the flange 58 for similarly deforming it radially inwardly into conductive engagement with the ring 57. The radial force required is greater than that required to grip the actuator for rotational drive, but still small enough so that a person can normally accomplish the necessary action by fingertip control. A preferred operating method for the illustrated embodiment is to apply actuator rotating forces at the knurled ends 61 of the actuator, over the bearing surfaces on members 36 and 37, and apply actuator deforming forces at the smooth portion between those ends and over flange 58.

The engagement between flange 58 and ring 57 constitutes an electric circuit closure between the common lead 21 connected to the collar 53 and the register lead 22 connected to the ring 57. This closure enables one of the gates 32 of FIG. 2 to register the selected and displayed digit value for future transmission or other use. The effect of that registration closure is further coupled to the ring counter 30 to step that counter to a next adjacent digit position so that the display 17 and register 33 are prepared to receive new digit selection information in a new digit position. Thus, the use of switch 13 in a telephone dialing application eliminates the need to coordinate finger and switch positions. The common actuator 38 for both circuit selection and separate circuit actuation enables a user to select a number to be dialed at a telephone station without the need for either seeing or feeling discrete dialing mechanism switches in order to coordinate finger positions with those switches.

Although the present invention has been described in connection with a particular embodiment thereof, it is to be understood that additional embodiments and applications thereof which will be obvious to those skilled in the art are included within the spirit and scope of the invention.

I claim:

1. A selector switch (13) comprising a common terminal (53), a plurality of further terminals (50) arrayed in a predetermined pattern, and means (38, 51) operable by a switch user for selectively closing an electric circuit path between one of said terminals of said plurality of terminals and said common terminal, said closing means including means for changing a terminal selection from one to another of said further terminals and in so doing causing a temporary path closure at each intervening terminal of said pattern, the switch being characterized in that it further includes an additional terminal (57), and means (38, 58), actuatable by said user and including at least a part of said selective closing means, for further closing an electric circuit path between said common terminal and said additional terminal, without interrupting the closure to the selected one of the further terminals, to indicate that one of said plurality of further terminals has been selected by said user.

2. The selector switch in accordance with claim 1 further characterized in that said selective closing means further comprises a fixed generally cylindrically shaped member (36) supporting said plurality of further terminals around the exterior of said member, a rotatable, hollow, generally cylindrical, actuator member (38) enclosing at least a part of said fixed member on which said terminals are supported and rotatable about such fixed member, and means (51) for coupling said common terminal to one of said plurality of terminals at a time as said actuator is rotated through predetermined different positions.

3. The selector switch in accordance with claim 2 further characterized in that said actuator member is formed of flexible material deformable by said user to actuate said indicating means, and said indicating means includes means (58), responsive to deformation of said flexible actuator member, for connecting said common terminal to said additional terminal.

4. The selector switch in accordance with claim 1 further characterized in that each of said further terminals corresponds to a different one of a plurality of information characters, and means (17) are provided for displaying the one of said characters corresponding to a selected one of said further terminals.

5. The selector switch in accordance with claim 4 further characterized in that said displaying means comprises a display (17) including plural digit display positions, means (23, 27, 29) for applying to one of said display positions signals for causing the display in an overwriting sequence of those of said characters corresponding to successive ones of said temporary path closures to said further terminals as a terminal selection is changed, and means (30), responsive to an output of said indicating means, for controlling said applying means to apply said signals to a different one of said display positions.

6. A selector switch (13) comprising a common terminal (53), a plurality of further terminals (50), and means (38, 51) for selectively closing an electric circuit path between one of said terminals of said plurality of terminals and said common terminal, the switch being characterized in that it further includes (a) an additional terminal (57), (b) means (38, 58, 57) including at least a part of said selective closing means, for indicating that one of said plurality of terminals has been selected, and (c) said selective closing means further comprises (1) a fixed member (36) supporting each of said plurality of terminals, said fixed member comprising (i) a first end portion (36) including a plurality of apertures (42) circularly distributed about the longitudinal axis thereof and each extending between the outer circumference of such member and an inner region thereof, (ii) a second end portion (37), (iii) said further terminals comprising plural elastic members (50), each being compressed into a different one of said apertures, (iv) plural detents (47) at the outer ends, respectively, of said apertures, and (v) a conductive collar (53) arranged around said first portion and longitudinally spaced from said outer ends of said apertures, said collar also comprising said common terminal, (2) a rotatable actuator member (38) enclosing in part said fixed member and rotatable about such fixed member, said actuator member comprising a generally cylindrical member (38) rotatably mounted on said first and second end portions, and a radially-extending interior recess (63) in said cylindrical member, and (3) means (51) for coupling said common terminal to one of said plurality of terminals at a time as said actuator is rotated through predetermined different positions, said coupling means comprising a conductive sphere (51) confined in said recess between said collar and said first end portion to be moved among said detents to establish electrical connections between said collar and different ones of said elastic members as said actuator is rotated.

7. The selector switch in accordance with claim 6 in which said actuator member is formed of flexible material which is deformable by a user to actuate said indicating means, and said indicating means includes means responsive to deformation of said flexible actuator member for connecting said common terminal to said additional terminal.

* * * * *